US012596271B2

(12) United States Patent (10) Patent No.: US 12,596,271 B2
Kaikkonen et al. (45) **Date of Patent: \*Apr. 7, 2026**

(54) OPTICAL COMMUNICATION DEVICE

(71) Applicant: II-VI Delaware, Inc., Wilmington, DE (US)

(72) Inventors: Andrei Kaikkonen, Jarfalla (SE); Simon Chen, Shanghai (CN); Robert Lewen, Tyreso (SE); Osamu Mizuhara, Allentown, PA (US)

(73) Assignee: II-VI DELAWARE, INC., Wilmington, DE (US)

( * ) Notice: Subject to any disclaimer, the term of this patent is extended or adjusted under 35 U.S.C. 154(b) by 394 days.

This patent is subject to a terminal disclaimer.

(21) Appl. No.: 18/295,720

(22) Filed: Apr. 4, 2023

(65) Prior Publication Data

US 2023/0244094 A1 Aug. 3, 2023

Related U.S. Application Data

(63) Continuation of application No. 17/004,677, filed on Aug. 27, 2020, now Pat. No. 11,650,436.

(60) Provisional application No. 62/896,880, filed on Sep. 6, 2019.

(51) Int. Cl.
| | |
|---|---|
| *G02F 1/01* | (2006.01) |
| *G02F 1/21* | (2006.01) |
| *H04B 10/516* | (2013.01) |

(52) U.S. Cl.
CPC .............. *G02F 1/0121* (2013.01); *G02F 1/21* (2013.01); *H04B 10/516* (2013.01); *G02F 1/212* (2021.01)

(58) Field of Classification Search
CPC ....... H04B 10/516; G02F 1/0121; G02F 1/21; G02F 1/212
See application file for complete search history.

(56) References Cited

U.S. PATENT DOCUMENTS

| | | | |
|---|---|---|---|
| 5,371,755 | A | 12/1994 | Murata et al. |
| 6,371,755 | B1 | 4/2002 | Dearth |
| 6,590,691 | B1 | 7/2003 | Nagra et al. |
| 7,010,179 | B2 * | 3/2006 | Hatta ...................... G02F 1/025 359/254 |

(Continued)

FOREIGN PATENT DOCUMENTS

| | | |
|---|---|---|
| CN | 110311735 A | 10/2019 |
| JP | 2004287071 A | 10/2004 |

(Continued)

*Primary Examiner* — Dalzid E Singh
(74) *Attorney, Agent, or Firm* — Blank Rome LLP

(57) ABSTRACT

An optical communication device may include a driver component, arranged to achieve a driving voltage, and a modulator component, including a laser or arranged to receive light from a laser. The modulator component may be arranged to achieve a modulated light signal modulated based on the driving voltage. The device may include a transmission line arranged to transfer the driving voltage between the driver component and the modulator component. The transmission line may not impedance matched to the driver component, the transmission line may have an impedance which is at least 20% lower than an output impedance of the driver component, and the transmission line may be impedance matched with respect to signal reflections to the modulator component.

20 Claims, 5 Drawing Sheets

(56) References Cited

U.S. PATENT DOCUMENTS

| | | | | |
|---|---|---|---|---|
| 9,436,019 | B1 * | 9/2016 | Pelekhaty | G02F 1/0121 |
| 10,608,408 | B1 * | 3/2020 | Lin | G02B 6/4274 |
| 11,650,436 | B2 * | 5/2023 | Kaikkonen | H04B 10/516 |
| | | | | 359/245 |
| 2002/0109897 | A1 * | 8/2002 | Mirshekar-Syahkal | |
| | | | | G02F 1/0327 |
| | | | | 359/245 |
| 2004/0208207 | A1 | 10/2004 | Kasper et al. | |
| 2004/0227649 | A1 * | 11/2004 | Mauro | H03M 7/02 |
| | | | | 341/69 |
| 2005/0152704 | A1 * | 7/2005 | Diaz | H04B 10/504 |
| | | | | 398/200 |
| 2005/0194663 | A1 | 9/2005 | Ishimura | |
| 2006/0221427 | A1 * | 10/2006 | Wu | G02F 1/025 |
| | | | | 359/241 |
| 2007/0206649 | A1 | 9/2007 | Chong et al. | |
| 2014/0233962 | A1 | 8/2014 | Kato | |
| 2014/0241659 | A1 | 8/2014 | Fukuda et al. | |
| 2015/0222236 | A1 | 8/2015 | Takemoto et al. | |
| 2017/0025816 | A1 | 1/2017 | Tanaka | |
| 2017/0033530 | A1 | 2/2017 | Cress | |
| 2018/0067341 | A1 | 3/2018 | Kanazawa et al. | |
| 2018/0109323 | A9 | 4/2018 | Welch et al. | |
| 2018/0356654 | A1 | 12/2018 | Tatsumi | |
| 2019/0045283 | A1 | 2/2019 | Troiani et al. | |
| 2019/0280775 | A1 | 9/2019 | Gao | |
| 2019/0377143 | A1 | 12/2019 | Tsuchiyama et al. | |
| 2020/0076157 | A1 | 3/2020 | Kaikkonen et al. | |
| 2020/0083663 | A1 | 3/2020 | Tsuchiyama et al. | |
| 2020/0371385 | A1 | 11/2020 | Amiralizadeh Asl et al. | |
| 2021/0066878 | A1 * | 3/2021 | Park | H01S 5/0261 |
| 2022/0100047 | A1 | 3/2022 | Gowda et al. | |

FOREIGN PATENT DOCUMENTS

| | | |
|---|---|---|
| JP | 2016109957 A | 6/2016 |
| KR | 20190059354 A | 5/2019 |
| WO | 2009048773 A1 | 4/2009 |
| WO | 2018031916 A1 | 2/2018 |

* cited by examiner

| ER_dB_w_CSR_1 | Eye_Amp | Eye_Height | Eye_Closure_percent |
|---|---|---|---|
| 13.511 | 0.922 | 0.807 | 87.527 |

OPTICAL COMMUNICATION DEVICE

CROSS-REFERENCE TO RELATED APPLICATIONS

This application is a continuation of U.S. patent application Ser. No. 17/004,677, filed Aug. 27, 2020, which claims priority to and the benefit of U.S. Provisional Patent Application No. 62/896,880 filed Sep. 6, 2019, titled OPTICAL COMMUNICATION DEVICE, which is incorporated herein by reference in its entirety.

BACKGROUND

Unless otherwise indicated herein, the materials described herein are not prior art to the claims in the present application and are not admitted to be prior art by inclusion in this section.

The present invention relates to an optical communication device. In particular, it relates to a device for modulating an optical laser signal for use in a high-frequency telecom or datacom communication system, such as in a 5G system. In particular, the invention relates to such modulating devices constructed from discreet components.

Such a modulating device conventionally comprises a discreet driver component, a transmission line and a discreet E/O (Electric/Optical) modulator component. The EO/modulator component typically comprises, or receives light from, a semiconductor laser, which light is modulated so as to carry a communicated signal received from the driver. The modulated light signal is then emitted for reception and demodulation at an external location. Typically, the modulated light signal will be fed into an optical distribution fiber.

The subject matter claimed herein is not limited to implementations that solve any disadvantages or that operate only in environments such as those described above. Rather, this background is only provided to illustrate one example technology area where some implementations described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

The present invention solves the above described problems, providing an efficient, low-complexity, broadband optical communication device that can be constructed from discreet components of standard type.

In an example embodiment, an optical communication device may include a driver component arranged to achieve a driving voltage; and a modulator component, comprising or arranged to receive light from a laser. The modulator component may be arranged to achieve a modulated light signal modulated based on the driving voltage. The optical communication device may include a transmission line arranged to transfer the driving voltage between the driver component and the modulator component. The transmission line may not impedance matched to the driver component. The transmission line may have an impedance which is at least 20% lower than an output impedance of the driver component. The transmission line may be impedance matched with respect to signal reflections to the modulator component.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features will become more fully apparent from the following description and appended claims, or may be learned by the practice as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
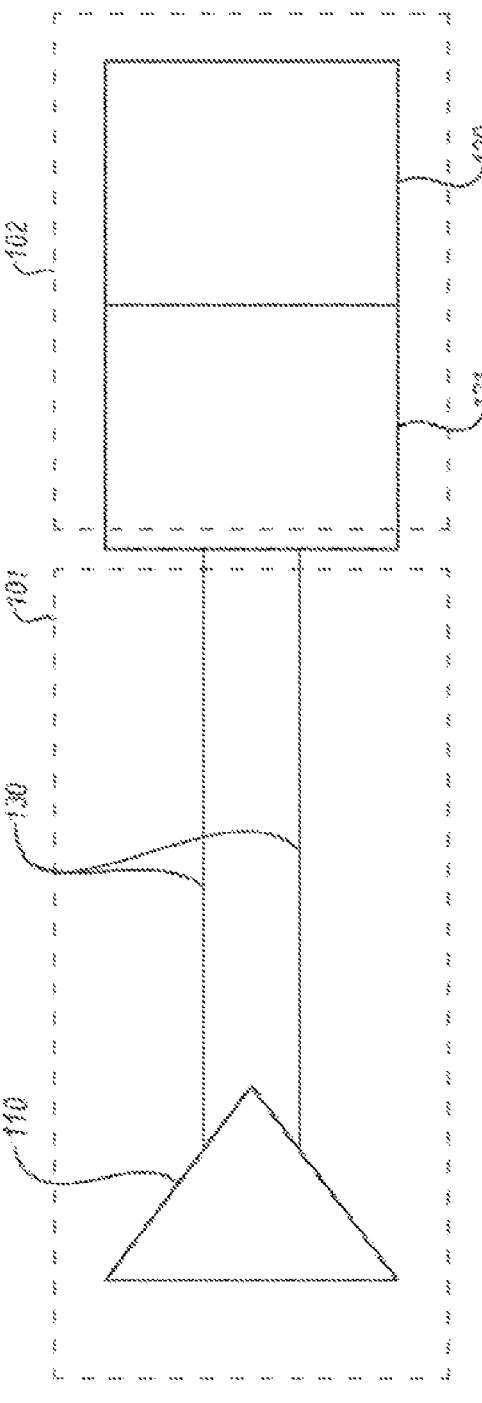
FIG. 1 illustrates a schematic view of an example of an optical communication device.

The present invention relates to an optical communication device. In particular, the disclosed embodiments relate to a device for modulating an optical laser signal for use in a high-frequency telecom or datacom communication system, such as in a 5G system. In particular, the invention relates to such modulating devices which may be constructed from discreet components. The disclosed embodiments provide an efficient, low-complexity, broadband optical communication device that can be constructed from discreet components of standard type.

A modulating device typically includes a discreet driver component, a transmission line and a discreet E/O (Electric/Optical) modulator component. The EO/modulator component typically includes, or receives light from, a semiconductor laser, which light is modulated so as to carry a communicated signal received from the driver. The modulated light signal is then emitted for reception and demodulation at an external location. Typically, the modulated light signal will be fed into an optical distribution fiber.

Normally, the driver component is impedance matched to the transmission line, which in turn is impedance matched to the modulator component using an impedance matching circuit (matching network). Such impedance matching is conventional as such, and has the purpose of avoiding loss and undesired reflections. Herein, such impedance matching is an impedance matching with the purpose of minimizing intersection reflection boundaries, and hence means that an output impedance is as close as possible to an input impedance.

Typically, transmission lines have characteristic impedance and/or surge impedance. In general, the present disclosure relates to characteristic impedance. Accordingly, when the term "impendence" is used throughout the application, the term is used in reference to characteristic impedance, rather than surge impedance.

For many communication applications, however, it is desired that such modulating devices cover a relatively broad frequency spectrum. When using standard components, which is desired for cost reasons, the impedance matching between the transmission line and the modulator component will typically work well for a certain predetermined modulating frequency interval, but it has proven difficult to achieve adequate impedance matching over a broad frequency interval, such as between 50 kHz and 25 GHz, without the impedance matching circuit becoming very complicated and lossy.

Poor impedance matching results in reflections between the transmission line and the modulator component, in turn leading to voltage overshoot and undershoot at the output of the driver component. With such overshoot and undershoot, the driver risks becoming saturated and hence non-linear. The bandwidth of the driver also decreases as a result. This is of course detrimental to the modulated light signal.

The difficulties of achieving large-spectrum impedance matching for the modulator component is partly due to the fact that the modulator component normally has relatively high internal capacitance. Such high capacitance yields high efficiency, but also a narrower impedance matching bandwidth.

FIG. 1 illustrates an optical communication device 100 according to one example embodiment. The optical communication device 100 comprises a discreet driver component 110 arranged to achieve a driving voltage, for driving a discreet electric/optical (E/O) modulator component 120 also comprised in the optical communication device 100.

That the driver component 110 and the modulator component 120 are "discreet" means that they are not integrated, in relation to each other, on the same integrated circuit. They may be provided as individual components, such as off-the-shelf components, that are individually mounted in place in the optical communication device 100 and electrically connected as a part of the fabrication process.

In FIG. 1, a first circuit board or substrate 101 is shown, on which the driver component 110 is mounted. Also, a second circuit board or substrate 102 is shown, on which the modulator component 120 is mounted. A transmission line 130 is arranged on the first substrate 101, but it is realized that the transmission line 130 may alternatively be arranged on the second substrate 102, or on a third (not shown) circuit board or substrate between the first substrate 101 and the second substrate 102. Electric connections between the first substrate 101 and the second substrate 102 may be provided using wire bonds or other suitable electrical couplings. The particular embodiment shown in FIG. 1 is merely an example, showing the principle that the driver component 110 and the modulator component 120 may be arranged on different circuit boards or substrates.

The discreet modulator component 120, in turn, may include a laser or may be arranged to receive light from a laser (not shown in FIG. 1), which may be a tunable laser. The modulator component 120 may be arranged to achieve a modulated light signal modulated based on the driving voltage. In other words, the laser light signal may be modulated by the driving voltage so as to produce the modulated light signal. The modulated light signal may then be transmitted to a receiver, where it may be demodulated so that the receiver may interpret a data payload carried by the modulated light signal.

The optical communication device 100 may include the transmission line 130, arranged to transfer the driving voltage between the driver component 110 and the modulator component 120, and in particular from the driver component 110 to the modulator component 120. This electric transmission line 130 may be included in embodiments where both the driver component 110 and the modulator component 120 are discreet components. As such, they will typically be arranged at a certain distance from each other in the optical communication device 100 and the transmission line 130 is arranged to transfer the produced driving voltage from the driver component 110 to the modulator component 120. The transmission line 130 may be manufactured from any suitable conducting material, but is normally made from metal.

When designing electric circuits, connected components are conventionally impedance-matched to each other with the aim of avoiding signal reflections at interfaces between regions, sections or components that are associated with different impedances. For instance, a frequently used driver impedance is 50 ohms. Then, a conventional transmission line also has an impedance of 50 ohms, being matched to the impedance of the driver component. Then, a modulator component being fed with drive voltage via the conventional transmission line will have an impedance matching network providing impedance matching for the modulator component to the transmission line across a desired frequency spectrum. This leads to the above-described problems of poor impedance matching in broad-spectrum applications, in turn leading to overshoot at the interface between the driver component and the transmission line.

To solve this problem, in the disclosed embodiments the transmission line 130 is not impedance matched to the driver component 110. Instead, the transmission line 130 has an impedance which may be at least 20% lower than an output impedance of the driver component 110. Then, the transmission line 130 is impedance matched with respect to signal reflections to the modulator component 120.

As mentioned above, the transmission line 130 may not be impedance matched to the driver component. Accordingly, the output impedance of the driver component 110 may be at least 20% greater than a characteristic impendence of the transmission line 130. Furthermore, the transmission line 130 may be impedance matched with respect to signal reflections to the modulator component 120. For example, if the transmission line 130 has a characteristic impedance of 100 ohms then the driver component 110 may have an output impedance of at least 125 ohms.

According to the concepts described herein, due to the capacitive nature of the modulator component 120, it may be much easier to produce a sufficient impedance matching between the transmission line 130 and the modulator component 120 in case a lower impedance is used for the transmission line 130 in relation to the output impedance of the driver component 110.

This results in less reflections at the intersection between the transmission line 130 and the modulator component 120, in turn resulting in lower risk of overshooting at the driver component 110, which still operates at a higher impedance.

At the same time, the driver component 110 typically has at least some parasitic capacitance across its outputs, normally being a collector and an emitter of a driver diode. This parasitic capacitance conventionally causes some unwanted reflections at the driver component. However, as the transmission line 130 has a lower impedance than the driver component according to what is described herein, this problem is also reduced due to a better impedance match between a local low-impedance region close to the output of the driver component 110 and the transmission line 130.

In some embodiments, the impedance of the transmission line 130 may be an impedance that is present across a broad frequency interval of the electric drive signal, such as a frequency interval of 50 kHz-25 GHz.

The transmission line 130 may be impedance matched to the modulator component 120 with respect to electric signal reflections across a frequency interval of at least 50 kHz-25 GHz.

In particular, the optical communication device 100 may comprise an impedance matching network 121 coupled to a modulator of the modulator component 120, and may be arranged between the transmission line 130 and the modulator component 120. The impedance matching network 121 may then be arranged to achieve the impedance matching between the transmission line 130 and the modulator component 120.

The transmission line 130 may have an impedance which is at least 40%, such as between 50% and 70%, such as between 55% and 65%, such as around 60%, of the output impedance of the driver component 110. It is noted that this percentage is true irrespectively of if the transmission line is a single ended (e.g., a coax transmission line) or differential transmission line.

Furthermore, the output impedance of the driver component 110 may be between 90 and 110 ohms differential, such as 100 ohms or substantially 100 ohms differential. Alternatively, it may be between 45 and 55 ohms single-ended, such as 50 ohms or substantially 50 ohms single-ended.

In this case, the impedance of the transmission line 130 may be between 40 and 80 ohms differential, such as between 50 and 70 ohms differential, such as between 55 and 65 ohms differential; or between 20 and 40 ohms single-ended, such as between 25 and 35 ohms single-ended, such as between 27 and 33 ohms single-ended.

In the optical communication device 100, the driver component 110 may be connected to the transmission line 130 without any intermediate components with non-negligible impedance. That the impedance is "non-negligible" means that they give rise to reflections at the intersection between the driver component 110 and the transmission line 130. Preferably, any connections between the driver component 110 and the transmission line may have dimensions that are much smaller, such as at least one, two or even three full magnitudes smaller, than a wavelength or pulse length of the electric signal propagating through the transmission line 130. This may mean that any such connections between the driver component 110 and the transmission line 130 are maximally 0.1 mm in a propagation direction of the electric signal through the connection in question in the communication types envisioned for the optical communication device 100. Hence, the driver component 110 may be essentially directly loaded into the lower impedance of the transmission line 130.

In particular, there may be no dedicated matching network circuitry provided between the driver component 110 and the transmission 130.

To the contrary, the transmission line 130 may be at least 1 mm of length, such as at least 5 mm of length or even at least 10 mm of length. Such relatively long lengths work well in the disclosed embodiments and may allow for design freedom of the components involved.

The optical communication device 100 may be a transceiver, also including a receiving light sensor (not shown in FIG. 1). In such a transceiver the receiving light sensor may be arranged together with associated driving circuitry in a way that avoids cross-talk and other problems, while being able to use a relatively long transmission line between the driver component 110 and the modulator component 120 may be important from a circuit design perspective.

In particular, the optical communication device 100 may be arranged for providing a modulated light signal using a non-return to zero (NRZ) modulation. In particular, the modulator component 120 may include a Mach-Zehnder modulating component used to produce such a non-return to zero modulation. Alternatively, the modulator component 120 may include an Electro-Absorption (EA) type of modulating component used or modulation.

Figure 2A:
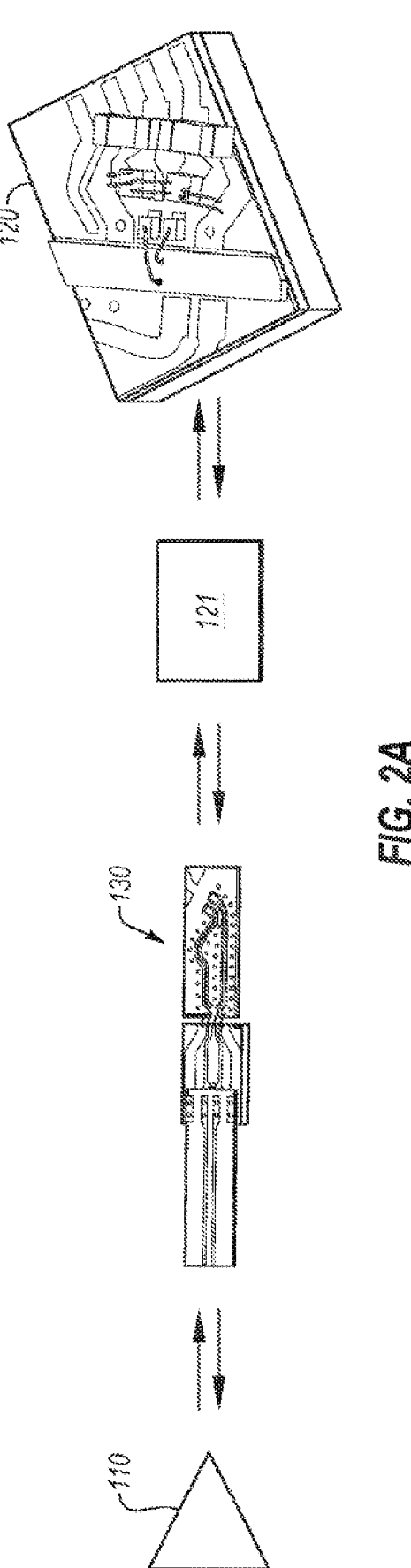
FIG. 2A illustrates a schematic view of an example embodiment of an optical communication device.
Figure 2B:
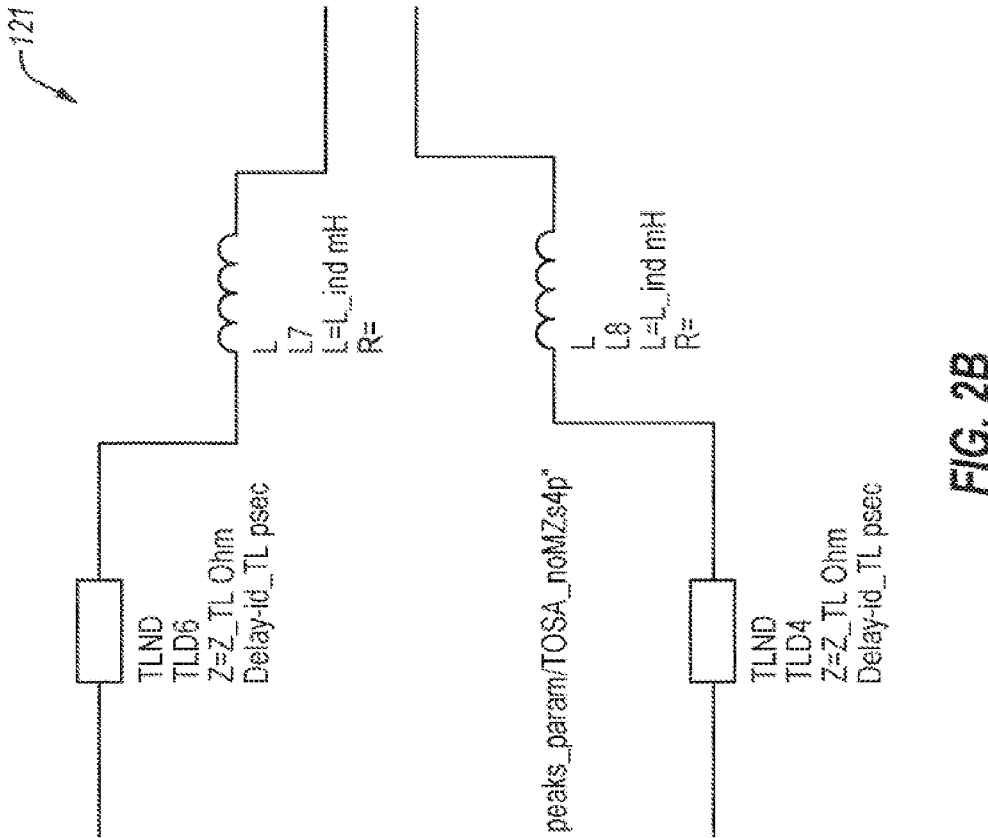
FIG. 2B illustrates a schematic view of a portion of the optical communication device of FIG. 2A.

FIG. 2A shows, using the same reference numerals as in FIG. 1 for corresponding parts, an example implementation of an optical communicating device of the present invention, for a non-return to zero, 25 Gbps radio-over-fiber transmitter using a Mach-Zehnder modulator. FIG. 2B illustrates an example embodiment of the impedance matching network 121 in further detail.

The electro-optical response curve ("S21" curve) of the modulator component 120 may have some ripple due to the impedance mismatch between the driver component 110 and the transmission line 130, but that for non-return to zero modulator components 120 eye diagrams with good metrics are produced despite the ripple.

Figure 3:
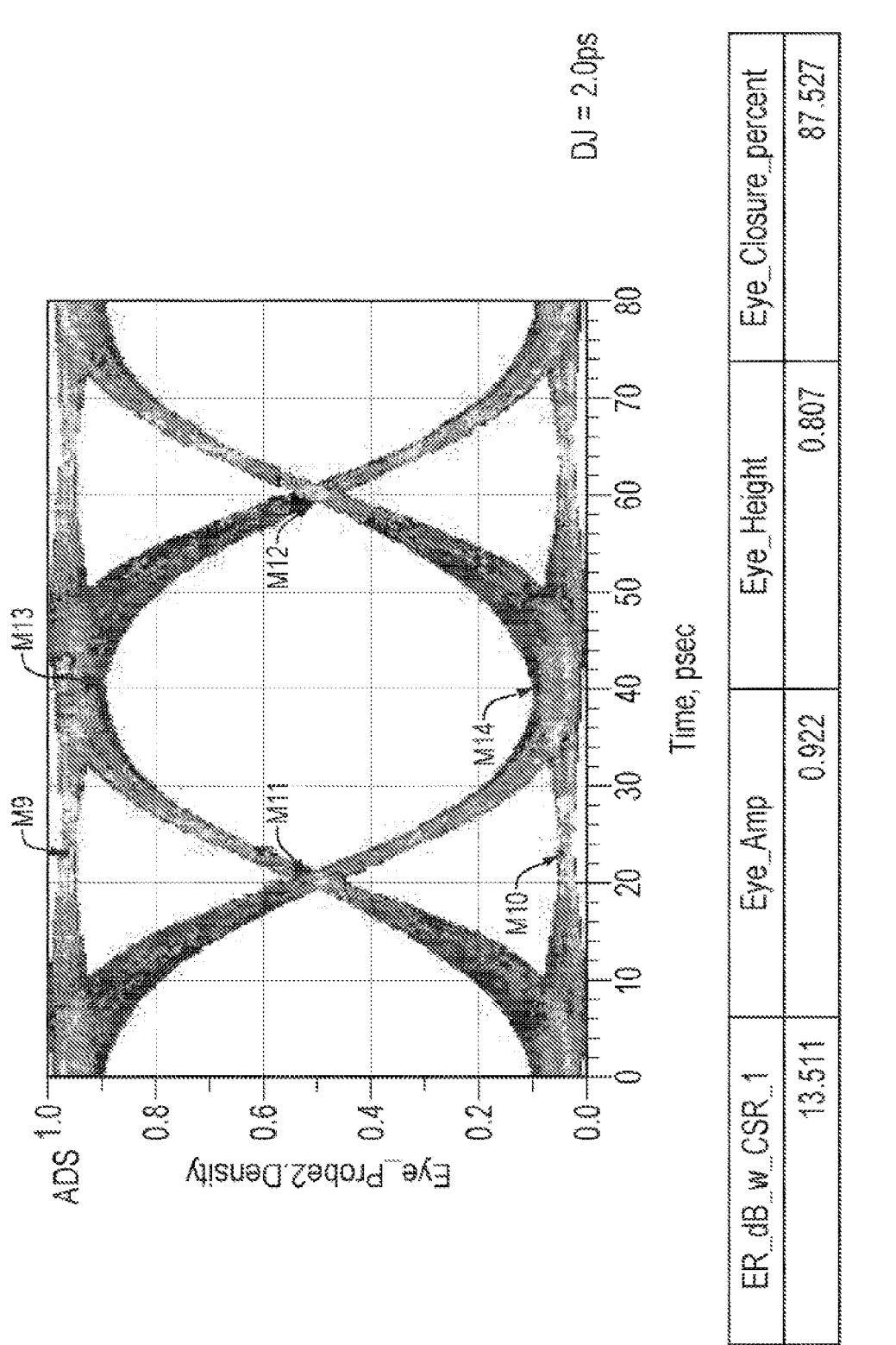
FIG. 3 is an eye diagram showing an optical performance of an optical communication device of the type illustrated in FIG. 1.

Hence, FIG. 3 shows an example optical output eye diagram from a Mach-Zehnder modulating component in an optical communication device according to the disclosed embodiments.

Figure 4:
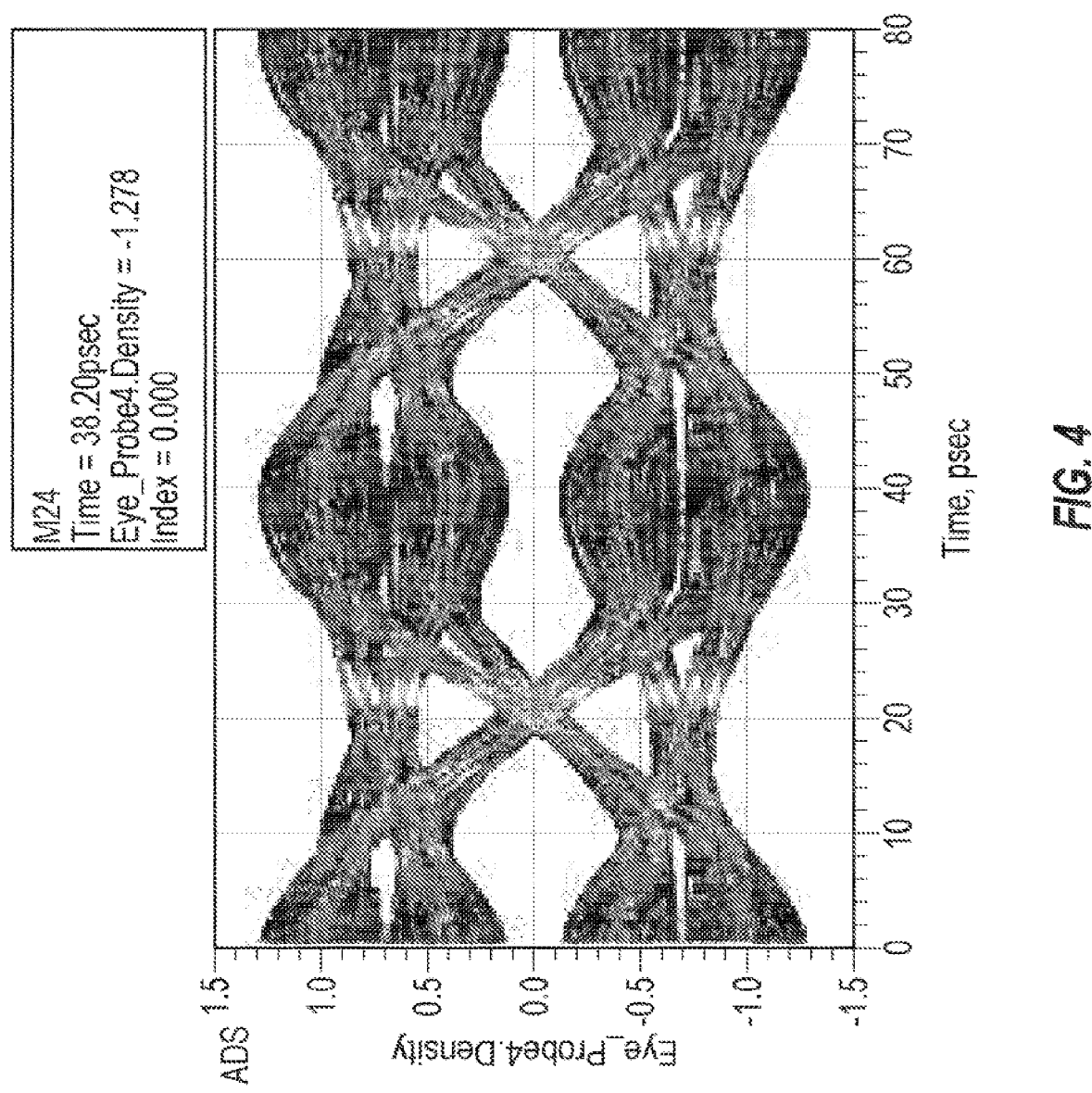
FIG. 4 is an eye diagram showing a voltage performance of an optical communication device of the type illustrated in FIG. 1.

FIG. 4 shows an example of a single-end AC voltage at an output of the driver component 110 (corresponding to 2 Vpp swing) of an optical communication device according to the disclosed embodiments. As shown in FIG. 4, such configuration achieves below 30% overshoots/undershoots. This has proven to result in no driver component 110 saturation, with 10 dB output mismatch tolerance up to Nyquist frequency.

In particular, the modulator component 120 may be arranged to modulate the light signal across a frequency spectrum with a width of at least 25 Gb/s. The modulation may be at frequencies above 10 Gb/s, such as at least 25 Gb/s. Even more particularly, the modulator component 120 may be arranged to provide modulation according to a per se conventional 25 Gb/s, 56 Gb/s or 100 Gb/s non-return to zero modulation scheme, corresponding to standards "25G", "50G" and "100G".

The optical communication device 100 of the disclosed embodiments may be used in datacom or telecom applications, and using fiber communication distances of at least 1 km.

Starting out from a conventional optical communication device design and modifying it to achieve an optical communication device 100 according to disclosed concepts, the impedance of the transmission line 130 may be reduced for the relevant frequencies. For instance, a conventional 100 ohms differential transmission line may have its impedance roughly halved. This can be achieved in several ways, that are freely combinable to suit the purposes at hand.

For instance, the transmission line may be made wider on a substrate on which it is arranged. Another alternative is to increase the epsilon value of a dielectric material present between ground and the transmission line. It is also possible to decrease a spacing between equally wide, parallel transmission lines. The height of a dielectric material between ground and the transmission line may also be reduced. Finally, the transmission line may also be longer, but this may increase build dimensions and cause unnecessary losses.

Above, various example embodiments have been described. However, it is apparent to the skilled person that many modifications can be made to the disclosed embodiments without departing from the basic idea of the invention.

For instance, the examples provided herein are based on a conventional 100 ohm differential design. However, in case the driver component impedance is different, the other impedance values discussed herein simply shift linearly together with the driver component impedance. In general, all embodiments described herein can be freely combined, as applicable and if compatible. Hence, the invention is not limited to the described embodiments, but can be varied within the scope of the enclosed claims.

Unless specific arrangements described herein are mutually exclusive with one another, the various implementations described herein can be combined in whole or in part to enhance system functionality or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical communication device, comprising:
a transmission line configured to transfer a driving voltage between a driver component and a modulator component;
wherein the transmission line is impedance matched with respect to signal reflections to the modulator component, and
wherein the transmission line has an impedance that is at lower than an output impedance of the driver component.

2. The optical communication device according to claim 1, wherein the transmission line has an impedance that is at least 20% lower than an output impedance of the driver component.

3. The optical communication device according to claim 1, wherein the impedance of the transmission line is present across a frequency interval of 50 kHz-25 GHz.

4. The optical communication device according to claim 1, wherein the transmission line is impedance matched to the modulator component with respect to signal reflections across a frequency interval of at least 50 kHz-25 GHz.

5. The optical communication device according to claim 1, further comprising an impedance matching network coupled to a modulator of the modulator component,
wherein the impedance matching network is arranged to achieve the impedance matching between the transmission line and the modulator component.

6. The optical communication device according to claim 1, wherein an output impedance of the driver component is one of (i) between 90 and 110 ohms differential and (ii) between 45 and 55 ohms single-ended.

7. The optical communication device according to claim 1, wherein the impedance of the transmission line is one of (i) between 40 and 80 ohms differential and (ii) between 20 and 40 ohms single-ended.

8. The optical communication device according to claim 1, wherein the driver component is connected to the transmission line without any intermediate components with non-negligible impedance.

9. The optical communication device according to claim 1, wherein modulation of the optical communication device is one of 25, 56, and 100 Gb/s, corresponding to 25G, 50G and 100G, non-return to zero modulation.

10. The optical communication device according to claim 1, wherein the modulator component is arranged to modulate a modulated light signal across a frequency spectrum of at least 25 Gb/s.

11. The optical communication device according to claim 1, wherein the driver component and the modulator component are discreet components.

12. The optical communication device according to claim 1, wherein the modulator component is a Mach-Zehnder modulator producing a non-return to zero modulation.

13. An optical communication system, comprising:
a transmission line configured to transfer a driving voltage between a driver component and a modulator component;
wherein the transmission line has an impedance that is at lower than an output impedance of the driver component.

14. The optical communication system according to claim 13, wherein the transmission line is impedance matched with respect to signal reflections to the modulator component.

15. The optical communication system according to claim 13, wherein the transmission line has an impedance that is at least 40% of an output impedance of the driver component.

16. The optical communication system according to claim 15, wherein the transmission line has an impedance that is between 50% and 70% of the output impedance of the driver component.

17. The optical communication system according to claim 16, wherein the transmission line has an impedance which is between 55% and 65% of the output impedance of the driver component.

18. The optical communication system according to claim 13, wherein the driver component and the modulator component are discreet components.

19. The optical communication system according to claim 13, wherein the modulator component is a Mach-Zehnder modulator producing a non-return to zero modulation.

20. An optical communication device, comprising:

a transmission line configured to transfer a driving voltage between a driver component and a modulator component;

wherein the transmission line is impedance matched with respect to signal reflections to the modulator component, and wherein the transmission line has an impedance that is at least 20% lower than an output impedance of the driver component.

* * * * *